(12) United States Patent
Nitta et al.

(10) Patent No.: US 6,937,370 B1
(45) Date of Patent: Aug. 30, 2005

(54) IMAGE DATA PROCESSING METHOD, IMAGE DATA PRINT APPARATUS, RECORD MEDIUM RECORDING IMAGE DATA PROCESSING PROGRAM

(75) Inventors: Takashi Nitta, Nagano (JP); Naoki Kuwata, Nagano (JP); Yoshihiro Nakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/449,772

(22) Filed: Nov. 26, 1999

(30) Foreign Application Priority Data

Nov. 26, 1998 (JP) .................................. 10-336346

(51) Int. Cl.$^7$ .............................................. G03F 3/08
(52) U.S. Cl. ..................................... 358/518; 358/1.15
(58) Field of Search ............................... 358/518, 1.15, 358/1.14, 506, 516, 522, 527, 1.9, 501; 382/162, 382/167

(56) References Cited

U.S. PATENT DOCUMENTS

| | | | | |
|---|---|---|---|---|
| 5,412,779 A | * | 5/1995 | Motoyama | 399/8 |
| 5,537,554 A | * | 7/1996 | Motoyama | 710/100 |
| 5,600,574 A | * | 2/1997 | Reitan | 702/185 |
| 5,694,484 A | * | 12/1997 | Cottrell et al. | 382/167 |
| 5,835,627 A | * | 11/1998 | Higgins et al. | 382/167 |
| 6,115,104 A | * | 9/2000 | Nakatsuka | 355/40 |
| 6,130,917 A | * | 10/2000 | Monroe | 375/295 |
| 6,163,389 A | * | 12/2000 | Buhr et al. | 358/527 |
| 6,281,992 B1 | * | 8/2001 | Kondo | 358/501 |
| 6,330,628 B1 | * | 12/2001 | Motoyama | 710/105 |
| 6,426,800 B1 | * | 7/2002 | Mizuno et al. | 358/1.15 |
| 6,643,029 B2 | * | 11/2003 | Kumada et al. | 358/1.9 |

* cited by examiner

Primary Examiner—Mark Wallerson
(74) Attorney, Agent, or Firm—Sughrue Mion, PLLC

(57) ABSTRACT

The characteristics of processing operation tendency, performance, etc., peculiar to image data acquisition means (digital still camera) are previously examined and the image data processing contents considering the characteristics of the digital still camera are preset in an image data processing content storage section 13 in correspondence with the model name of the digital still camera. The image data acquired with one digital still camera is read into an image data read section 11, a model determination section 12 determines the model name, an image data processing section 14 selects the image data processing contents corresponding to the determination result in response thereto and processes the image data in accordance with the image data processing contents, and a print processing section 15 performs print processing. The image data processing to be performed includes image data correction processing for making a color correction, etc., and resizing processing for enlarging or reducing the image data corresponding to the model.

12 Claims, 4 Drawing Sheets

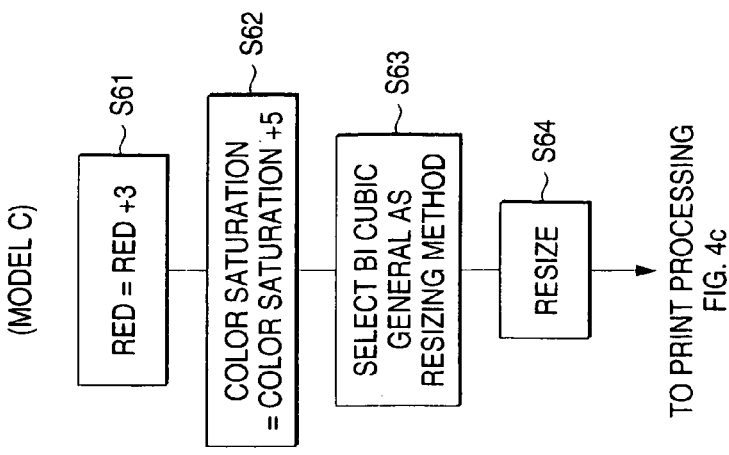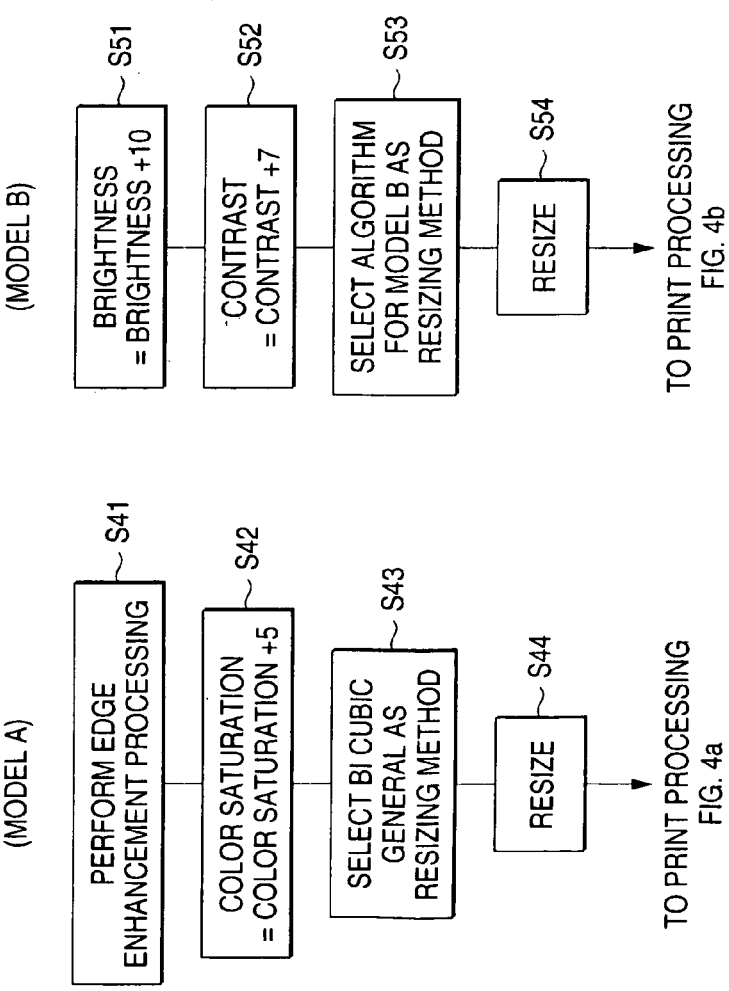

IMAGE DATA PROCESSING METHOD, IMAGE DATA PRINT APPARATUS, RECORD MEDIUM RECORDING IMAGE DATA PROCESSING PROGRAM

BACKGROUND OF THE INVENTION

1. Field of Invention

This invention relates to an image data processing method for processing image data acquired by image data acquisition means, such as a digital still camera, so as to provide the optimum output result, an image data print apparatus for processing image data acquired by image data acquisition means so as to provide the optimum print result and then print the image data, and a record medium recording an image data processing program for processing image data acquired by image data acquisition means so as to provide the optimum output result.

2. Related Art

In recent years, digital still cameras have become widespread. To print image data provided by photographing with the digital still camera, it is a common practice to once read the image data into a personal computer (PC) from a memory card, etc., storing the image data and then print the image data on a printer connected to the PC. Thus, formerly it was necessary to once read the image data into the PC before printing on the printer.

In recent years, however, development of an image data print apparatus provided with a data processing function executed by a PC for reading image data directly from a memory card containing a photograph already taken with a digital still camera and processing the read image data so as to provide the optimum output result, then printing the image data (the image data print apparatus having such a function will be referred to as a photo printer) has been proceeding.

The photo printer consists roughly of a print processing section for performing the operation similar to that of a former printer and an image data processing section for performing image data processing similar to that of a PC for the image data in a memory card. The photo printer makes it possible to directly print image data without intervention of a PC; it is extremely convenient. Therefore, if such a photo printer can be provided at a low price, it seems that the widespread of the digital still cameras furthermore proceeds.

The image data that can be handled with this kind of photo printer is not only the image data acquired by the digital still cameras, but also the image data acquired by image scanners, film scanners, digital video cameras, etc. The machines for handling images as digitized data, such as the digital still cameras, image scanners, film scanners, digital video cameras, will be referred to as image data acquisition means.

It is a general rule that the above-described photo printer does not limit models as the image data acquisition means and can also handle image data provided by most models.

That is, taking digital still cameras as an example as image data acquisition means, often the digital still cameras are manufactured by several manufacturers and further models different in performance, function, etc., are also manufactured and sold by one manufacturer.

For example, assume that one manufacturer manufactures three models of digital still cameras different in performance and function (models A, B, and C). Generally, the models A, B, and C differ in performance, function, etc., and also in price although they fall under the same category of digital still cameras.

Thus, to classify products of one category into several models according to the performance, function, etc., model names unique to the manufacturer are assigned to the models to identify the models. For example, model name "DC-1000" is given to the model A, model name "DC-20001", to the model B, and "DC-3000", to the model C; they are also called model numbers.

The models A, B, and C have tendency and performance on the processing operation proper to each model (the tendency and performance on the processing operation will be hereinafter referred to as characteristics). For example, the model A has tendency to generally output low color saturation and the model C has tendency to output weak contrast.

Thus, even taking the digital still cameras in one manufacturer as an example, the characteristics peculiar to each model exist. The same applies not only to the digital still cameras, but also to any other image data acquisition means such as the image scanners described above.

If the image data provided by photographing, for example, with a digital still camera is printed on the above-described photo printer intact without considering the characteristics peculiar to the model, the print result is produced with the characteristics peculiar to the model appearing intact. That is, if the image data of a picture taken with a digital still camera hard to output high color saturation is used for printing with no change, the print result is produced with low color saturation corresponding to the image data.

It is also possible for the user to manually make a correction to the characteristics peculiar to each model when executing print; however, the setting process for making a correction is not easy and it is extremely difficult to make an unspecified number of the users execute this kind of setting.

Particularly, for the photo printer as described above, how easy the image data provided by a digital still camera, etc., can be printed is a large selling point as a product; ease of operation as well as the ability to execute high-quality printing is strongly required for the photo printer. That is, it becomes important to be able to print by such extremely easy operation of simply inputting the image data of a picture taken with a digital still camera to the photo printer (for example, inserting a memory card containing an already taken photograph into the photo printer) and then pressing the minimum necessary operation button for printing, thereby immediately starting to print the image data. Moreover, the printed image requires the quality not inferior to that of a conventional photo, and various types of convenience for also enabling resizing such as reduction and enlargement are also required.

SUMMARY OF THE INVENTION

It is therefore an object of the invention to make it possible to produce a high-quality print result regardless of the model difference by automatically performing image data processing considering the characteristics peculiar to each model as image data acquisition means.

To the end, according to the invention, there is provided an image data processing method for making it possible to read image data acquired by different types of image data acquisition means and processing the read image data so as to provide an optimum output result, the image data processing method comprising the steps of, in response to identification information assigned for identifying the different types of image data acquisition means, presetting image data processing contents considering processing operation characteristics of the image data acquisition means assigned the identification information, reading the image data provided by one image data acquisition means as image data to be processed, determining which image data acquisition means the image data to be processed is acquired by according to the identification information, selecting the image data processing contents corresponding to the determination result in response thereto, and processing the image data to be processed so as to provide the optimum output result in accordance with the selected image data processing contents.

The identification information assigned for identifying the different types of image data acquisition means is model names assigned to the image data acquisition means.

The image data processing contents are at least either of image correction processing contents for making a correction to an image and image scaling processing contents for enlarging or reducing an image, the image correction processing contents include color correction processing, brightness correction processing, contrast correction processing, color saturation correction processing, noise removal processing, smoothing processing, and contour correction processing, at least one correction processing of which is performed, and the image scaling processing contents are to perform image scaling processing set based on the resolution of the image data acquisition means.

The image data to be processed is image data on a record medium recording the image data acquired by the image data acquisition means and the identification information is information existing together with the image data recorded on the record medium.

The image data to be processed may be image data transferred through communication means from the image data acquisition means and the identification information is information existing together with the image data transferred through the communication means.

According to the invention, there is provided an image data print apparatus for making it possible to read image data acquired by different types of image data acquisition means, processing the read image data so as to provide an optimum output result, and printing the processed image data, the image data print apparatus comprising an image data read section capable of reading image data acquired by different types of image data acquisition means as image data to be processed, a model determination section for determining which image data acquisition means the image data acquisition means is from identification information assigned for identifying the different types of image data acquisition means, an image data processing content storage section for storing image data processing contents considering the processing operation characteristics of the image data acquisition means assigned the identification information in response to the identification information assigned for identifying the different types of image data acquisition means, an image data processing section for receiving the determination result from the model determination section, selecting the image data processing contents corresponding to the determination result out of the image data processing content storage section, and executing the image data processing contents, and a print processing section for performing print processing of the image data processed by the image data processing section.

In the image data print apparatus, the identification information assigned for identifying the different types of image data acquisition means is model names assigned to the image data acquisition means.

The image data processing contents executed by the image data processing section are at least either of image correction processing contents for making a correction to an image and image scaling processing contents for enlarging or reducing an image, the image correction processing contents include color correction processing, brightness correction processing, contrast correction processing, color saturation correction processing, noise removal processing, smoothing processing, and contour correction processing, at least one correction processing of which is performed, and the image scaling processing contents are to perform image scaling processing set based on the resolution of the image data acquisition means.

The image data to be processed, read by the image data read section is image data on a record medium recording the image data acquired by the image data acquisition means and the identification information is information existing together with the image data on the record medium.

The image data to be processed, read by the image data read section may be image data transferred through communication means from the image data acquisition means and the identification information is information existing together with the image data transferred through the communication means.

According to the invention, there is provided a record medium recording an image data processing program for making it possible to read image data acquired by different types of image data acquisition means, processing the read image data so as to provide an optimum output result, and printing the processed image data, the image data processing program comprising the steps of reading image data acquired by one image data acquisition means as image data to be processed, determining which image data acquisition means the image data acquisition means is from identification information assigned for identifying the different types of image data acquisition means, and receiving the determination result as to which image data acquisition means the image data acquisition means is, selecting the image data processing contents considering the processing operation characteristics of the image data acquisition means, and performing image data processing responsive to the image data processing contents.

The identification information assigned for identifying the different types of image data acquisition means is model names assigned to the image data acquisition means.

The image data processing contents are at least either of image correction processing contents for making a correction to an image and image scaling processing contents for enlarging or reducing an image, the image correction processing contents include color correction processing, brightness correction processing, contrast correction processing, color saturation correction processing, noise removal processing, smoothing processing, and contour correction processing, at least one correction processing of which is performed, and the image scaling processing contents are to perform image scaling processing set based on the resolution of the image data acquisition means.

The image data to be processed is image data on a record medium recording the image data acquired by the image data acquisition means and the identification information is information existing together with the image data recorded on the record medium.

The image data to be processed may be image data transferred through communication means from the image data acquisition means and the identification information is information existing together with the image data transferred through the communication means.

If digital still cameras are taken as an example as the image data acquisition means, the invention provides high-quality print regardless of the difference in the models of the digital still cameras. That is, the image data acquisition means such as the digital still cameras differ in processing operation tendency and performance from one model to another (characteristics peculiar to each model). Then, a high-quality output result is produced regardless of the model difference by automatically performing image data processing fitted to the characteristics peculiar to each model and then producing output.

To accomplish this, first the image data processing contents considering the characteristics peculiar to the image data acquisition means are preset in response to the identification information assigned for identifying the image data acquisition means. When the image data provided by one image data acquisition means is read as the image data to be processed, which image data acquisition means the image data to be processed is acquired by is determined according to the identification information, and the image data is processed in accordance with the optimum image data processing contents responsive to the determination result.

Thus, the image data processing considering the characteristics peculiar to the model of the image data acquisition means is performed automatically and the image data processed considering the characteristics peculiar to the model is used to output an image, so that a high-quality output result can be produced regardless of the model difference.

The model names assigned to the image data acquisition means are used as the identification information assigned for identifying the image data acquisition means. So-called model numbers can also be used as the model names. It is a general rule that the model numbers are all products, and use of the already existing identification information eliminates the need for preparing new identification information to embody the invention. It is also a general rule that the information indicating the model name exists together with the read image data, thus the model name can be specified easily.

As the image data processing contents executed considering the characteristics peculiar to the model, for example, if the model acquiring the image data to be processed is identified, image processing corresponding to the identified model is performed. Specifically, if the fact that the model a little lacks brightness is previously examined, to cope with the defect, such setting for enhancing the brightness in the plus direction is previously executed. Such setting is previously executed, whereby image correction processing is automatically performed considering the characteristics peculiar to the model and the processed image data is used to print, whereby a high-quality print result can be produced regardless of the model difference.

To perform scaling processing, the scaling processing contents are changed depending on the resolution of the image data acquisition means, whereby optimum scaling processing for the read image data can be performed. An optimum resizing method is selected depending on the resolution, for example, in such a manner that if the resolution of the image data provided by one model in a lateral direction is the same as that in a longitudinal direction, resizing processing is performed according to a general resizing processing method and that if the resolution of the image data in the lateral direction differs from that in the longitudinal direction, resizing processing is performed according to the corresponding resizing processing method.

The image data to be processed may be image data recorded on record media such as a memory card and a floppy disk and may be image data transferred through various communication means from the image data acquisition means. Since the image data to be processed can be input through various means, the printable image data is not limited to specific image data and a wide range of image data can be handled, whereby various image data acquisition means can be used as the image data acquisition means.

Thus, in the invention, image data processing considering the characteristics peculiar to the model can be executed and image data processing fitted to the model is performed automatically on the print apparatus, so that the user need not be conscious of the processing operation characteristics of the image data acquisition means such as digital still cameras at all and needs only to perform operation required for outputting, whereby a high-quality output result can be produced.

BRIEF DESCRIPTION OF THE DRAWINGS

In the accompanying drawings:

FIG. 4A is a flowchart to show the image data processing contents and a processing sequence for model A shown in the flowchart of FIG. 3;

FIG. 4B is a flowchart to show the image data processing contents and a processing sequence for model B shown in the flowchart of FIG. 3; and FIG. 4C is a flowchart to show the image data processing contents and a processing sequence for model C shown in the flowchart of FIG. 3.

DESCRIPTION OF THE PREFERRED EMBODIMENTS

Referring now to the accompanying drawings, there is shown one preferred embodiments of the invention. In the description of the embodiment, a photo printer as described above is taken as an example as an image data print apparatus. Assume that image data acquisition means used in the embodiment is a digital still camera.

Figure 1:
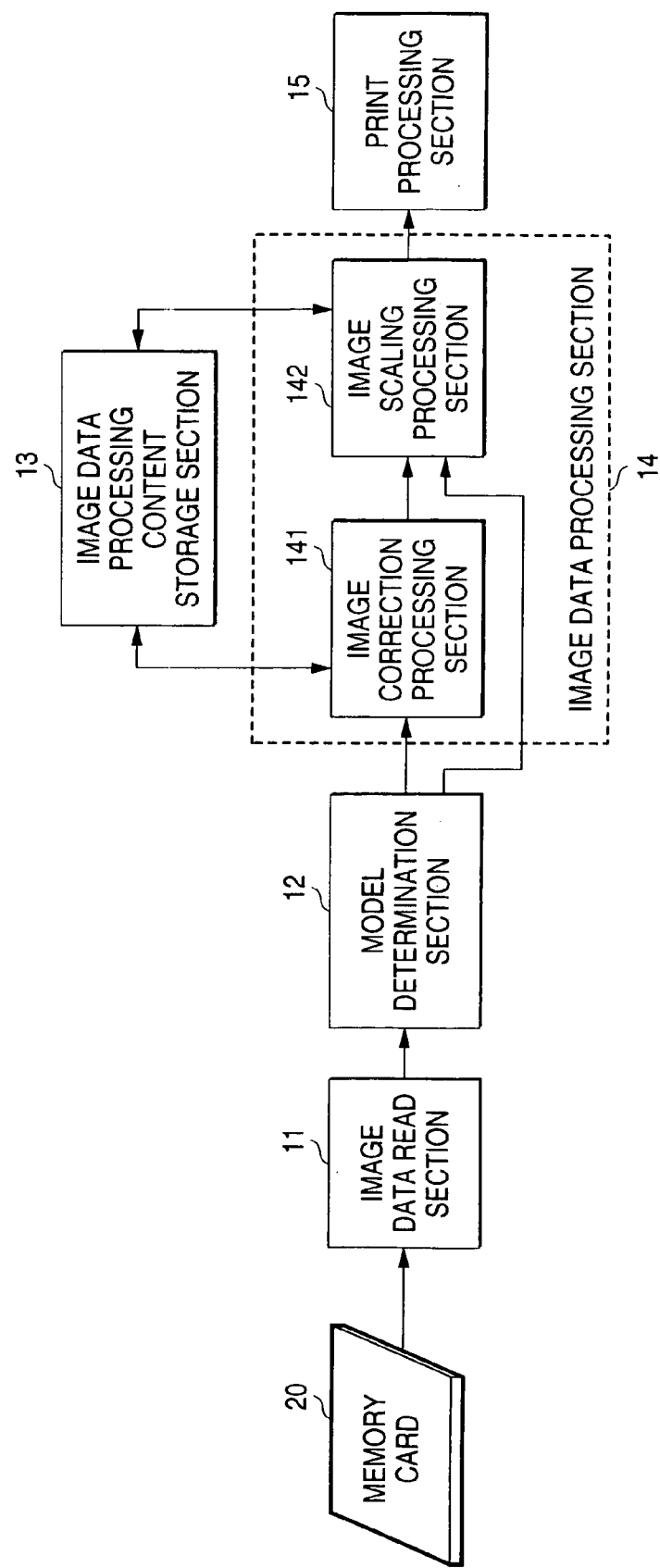
FIG. 1 is a block diagram to schematically show the configuration of a photo printer used in an embodiment of the invention.

FIG. 1 shows schematically the configuration of a photo printer in the invention. The photo printer comprises an image data read section 11 capable of reading image data acquired by different types of image data acquisition means as image data to be processed, a model determination section 12 for determining which image data acquisition means the image data acquisition means is from identification information assigned to identify the different types of image data acquisition means, an image data processing content storage section 13 for storing the image data processing contents considering the characteristics peculiar to the image data acquisition means assigned the identification information in response to the identification information assigned for identifying the different types of image data acquisition means, an image data processing section 14 for receiving the determination result from the model determination section 12, selecting the image data processing contents considering the characteristics peculiar to the image data acquisition means out of the image data processing content storage section 13, and executing the image data processing contents, a print processing section 15 for performing print processing of the image data processed by the image data processing section 14, and the like.

In the embodiment, model names are used as the above-described identification numbers. The model names are model numbers, etc., uniquely assigned to the models, as described above.

The image data processing section 14 is made up of an image correction processing section 141 for making a correction to an image and an image scaling processing section 142 for enlarging or reducing an image.

The image correction processing section 141 receives the determination result from the model determination section 12, selects the image data processing contents considering the characteristics peculiar to the corresponding model stored in the image data processing content storage section 13, and corrects the image in response to the selected image data processing contents (in this case, image data correction processing contents).

The image scaling processing section 142 receives the determination result from the model determination section 12, selects the image data processing contents considering the characteristics peculiar to the corresponding model stored in the image data processing content storage section 13, and corrects the image in response to the selected image data processing contents (in this case, image scaling processing contents). (Image enlargement or reduction (scaling) will be hereinafter referred to as resizing.).

The photo printer also includes various components responsive to the functions of the photo printer in addition to the components shown in FIG. 1; FIG. 1 shows only the components related directly to the invention and does not show other components.

The image data to be processed, input to the photo printer may be image data stored on record media such as a memory card and floppy disk and further may be image data transferred from image data acquisition means through a transmission system of infrared communication, a universal serial bus (USB), a small computer system interface (SCSI), IEEE 1394, a radio local area network (LAN), etc. Therefore, the image data read means 11 can be provided with interfaces that can be compatible with the image input systems. FIG. 1 shows an example wherein image data is input through a memory card 20.

By the way, the image data processing contents stored in the image data processing content storage section 13 are preset corresponding to each model; the characteristics peculiar to each model are examined and the image data processing contents considering the characteristics peculiar to the model are preset. The image data processing contents considering the characteristics peculiar to the model mentioned here refer to the image data processing contents considering the tendency and performance on the processing operation of the model, and the specific image data processing contents will be discussed later.

Figure 2:
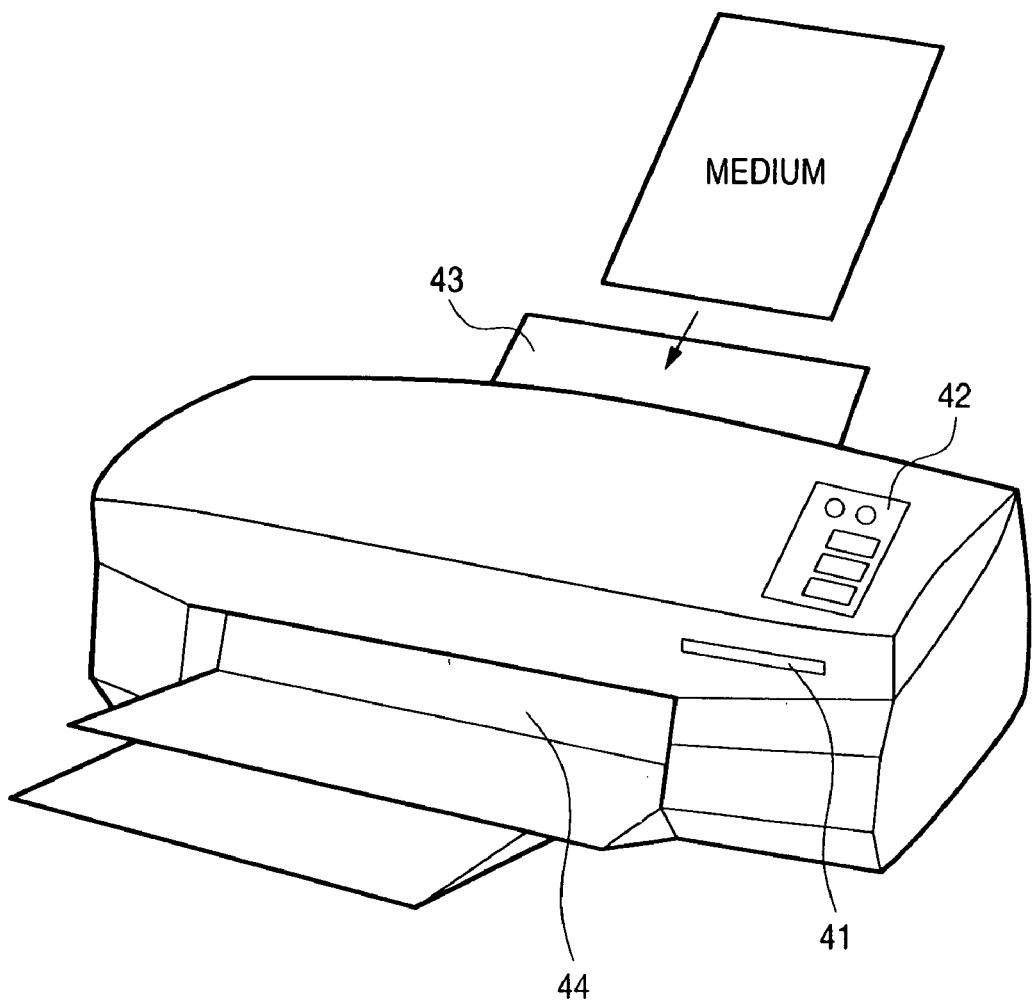
FIG. 2 is a drawing to schematically show the appearance of the photo printer used in the embodiment of the invention.

FIG. 2 is a drawing to show the appearance of the photo printer used in the embodiment. The photo printer is similar to a general printer on external structure, but is provided with a card insertion section 41 into which a memory card 20 is inserted. In addition, the photo printer is provided with an operation panel section 42 for executing various types of operation setting, a paper feed section 43, a paper discharge section 43, etc. Further, the photo printer comprises a cable connection terminal if image data can be input over a cable, a reception section of image data if image data can be input by radio communication, and the like although the components are not shown in FIG. 2.

An operation example of the photo printer having the described configuration will be discussed with reference to flowcharts of FIGS. 3 and 4A, 4B, and 4C. For easy understanding of the operation description, in the example, three models of models A, B, and C are adopted as the models of digital still cameras and are distinguished from each other so that image data processing responsive to the identified model is performed. The flowchart contents of FIGS. 3 and 4A, 4B, and 4C are also the specific processing contents of an image data processing program of the invention.

Here, assume that the image data provided by one digital still camera is stored on a memory card 20 as an image data file and that the memory card 20 is inserted into the card insertion section 41, whereby the image data read section 11 reads the image data file on the memory card 20.

First, the image data read section 11 reads the image data from the image data file at step S1 and the model determination section 12 acquires identification information representing the model name existing in the image file at step S2 and determines which model the identification information corresponds to at step S3.

The model determination performed by the model determination section 12 is as follows: The identification information representing the model name existing in the read image data (for example, information representing the model number of the model as described above) is read and which model the image data is provided by is determined. Since it is a general rule that the identification information representing the model name of the digital still camera providing the image data exists in the image data file together with the image data, the model can be easily determined based on the identification information.

When the model name is thus determined, the image data processing contents corresponding to the determined model name are selected and image data processing is performed in response to the selected image data processing contents at step S4, S5, or S6.

For example, if the model name is determined the model A, the image data processing contents corresponding to the model A are selected and image data processing is performed in accordance with the contents at step S4, then print processing is performed using the processed image data at step S7. If the model name is determined the model B, the image data processing contents corresponding to the model B are selected and image data processing is performed in accordance with the contents at step S5, then print processing is performed using the processed image data at step S7. Further, if the model name is determined the model C, the image data processing contents corresponding to the model C are selected and image data processing is performed in accordance with the contents at step S6, then print processing is performed using the processed image data at step S7.

The image data processing contents responsive to the models in the processing sequence are specifically the processing contents as shown in FIGS. 4A, 4B, and 4C. The image data processing contents will be discussed with reference to FIGS. 4A, 4B, and 4C. The processing contents for each model are preset.

Figure 3:
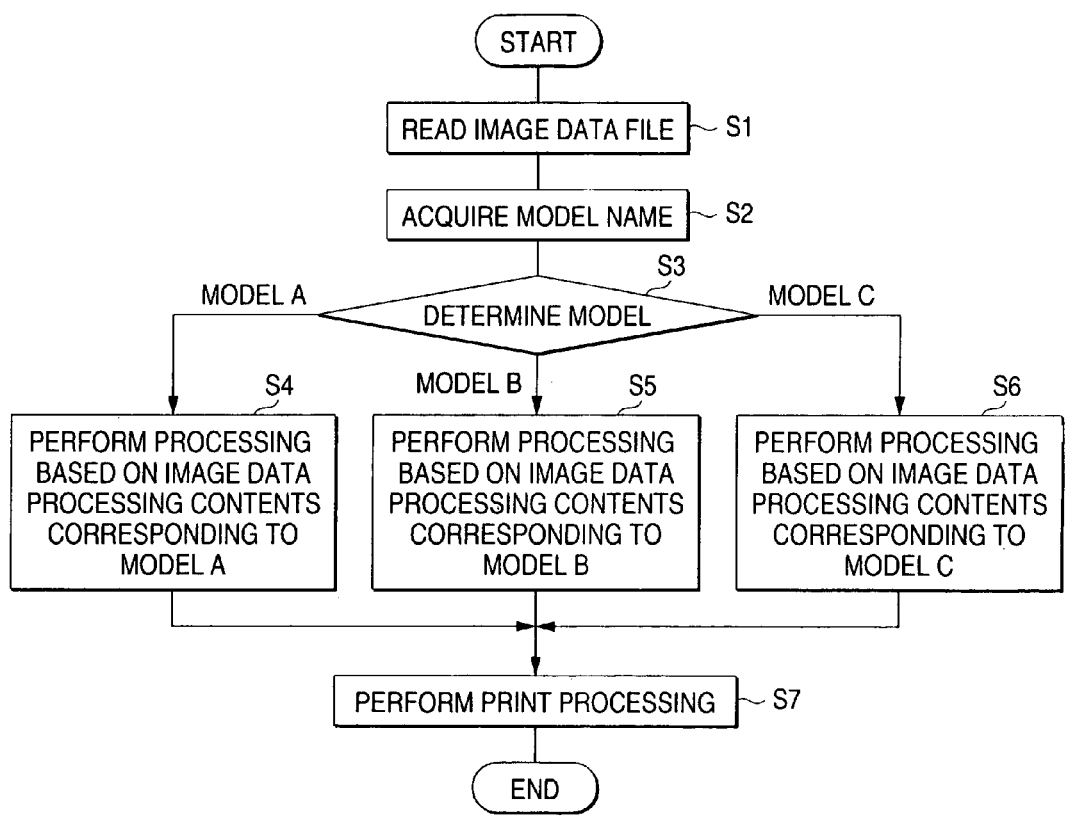
FIG. 3 is a flowchart to show the whole processing sequence in the embodiment of the invention.

FIG. 4A shows the image data processing contents for the image data provided by the model A. First, edge enhancement processing is performed at step S41, then color saturation correction processing for adding five to the color saturation is performed at step S42, then processing of selecting a bi cubic general as a resizing processing content method is performed at step S43 and resizing processing is performed according to the selected resizing processing method at step S44. After various types of image correction processing and resizing processing are thus performed, the print processing at step S7 in the flowchart of FIG. 3 is performed.

The resizing processing according to the general bi cubic is resizing processing means applied if the resolution of an image in a lateral direction is the same as that in a longitudinal direction.

FIG. 4B shows the image data processing contents for the image data provided by the model B. First, brightness enhancement processing for adding 10 to the brightness is performed at step S51, then contrast enhancement processing for adding seven to the contrast is performed at step S52, then the resizing processing contents set for the model B are selected as the resizing processing contents at step S53 and resizing processing based on the selected resizing processing contents is performed at step S54. After various types of image correction processing and resizing processing are thus performed, the print processing at step S7 in the flowchart of FIG. 3 is performed.

The resizing processing based on the resizing processing contents set for the model B described above is as follows: If the resolution of the image data provided by the model B in a lateral direction differs from that in a longitudinal direction, for example, in such a manner that the resolution in the lateral direction is high and that in the longitudinal direction is low, when the image data is enlarged, for example, as resizing processing, enlargement processing considering the resolution is performed. That is, for the image data having a high resolution in the lateral direction and a low resolution in the longitudinal direction as compared with the resolution in the lateral direction, resizing processing is performed so as to increase the resolution in the longitudinal direction. Such resizing processing becomes effective particularly for enlarging an image.

FIG. 4C shows the image data processing contents for the image data provided by the model C. First, color correction processing for adding three to color in a red direction is performed at step S61, then color saturation correction processing for adding five to the color saturation is performed at step S62, then processing of selecting a bi cubic general as a resizing method is performed at step S63 and resizing processing is performed according to the selected resizing processing method at step S64. After the image processing is thus performed, the print processing at step S7 in the flowchart of FIG. 3 is performed.

Thus, image processing responsive to each model is performed and print processing is performed using the image data resulting from performing the image processing, whereby an image correction is made considering the characteristics peculiar to the model and moreover resizing processing is also performed in response to the optimum resizing processing contents corresponding to the model, so that the image output as the print result becomes a high-quality image.

By the way, the image data processing contents corresponding to the models (in this case, models A, B, and C) are preset for each model, in which case the characteristics peculiar to the model are examined and the image data processing contents corresponding to the peculiar characteristics are set.

For example, considering the model A, if it is judged that the image data provided by the model A a little lacks sharpness of the edge part of an image, edge enhancement processing is added as the image data processing contents to correct the defect. If it is judged that there is a tendency to output low color saturation, how much the color saturation is enhanced in the plus direction for providing an optimum image is determined and a correction is made so as to provide appropriate color saturation. In the example in the flowchart of FIG. 4A, adding five to the color saturation is set for the model A and the color saturation is corrected according to the setting.

Further, what resizing processing contents are optimum is previously determined based on the image resolution in such a manner that resizing processing is performed according to a cubic of a general resizing processing algorithm because the resolution provided by the model A in the longitudinal direction is the same as that in the lateral direction.

Thus, the characteristics peculiar to the model A are previously examined and the image data processing contents corresponding to the peculiar characteristics are preset. This also applies to the models B and C; the characteristics peculiar to each target model are previously examined in a similar manner and the image data processing contents corresponding to the peculiar characteristics are preset.

As described so far, according to the embodiment, if the image data provided by any of the three models of digital still cameras, namely, model A, B, or C is input, first which model the input image data is provided by is determined, then the image data processing contents corresponding to the model are selected based on the determination result, the selected image data processing contents are executed, and print processing of the image data processed accordingly is performed.

Thus, an image correction considering the peculiarity and characteristics that each model has and optimum resizing processing based on the resolution of the image data to be processed are performed before print processing is executed, so that a print image of good quality can be provided.

Therefore, for example, if there are characteristics peculiar to one model such that the model tends to provide bluish image data on the whole, according to the invention, the print apparatus determines the model name and performs image data processing based on the preset image data processing contents in response to the model name (in this case, performs processing of enhancing the color in the red direction), whereby an appropriate color correction can be made and print processing of the post-processed image data is performed, whereby an image is printed in appropriate color.

Such image data processing contents are all set on the print apparatus side and image data processing responsive to the setting is automatically performed, so that the user need not be conscious of the characteristics, etc., of the digital still camera at all and needs only to perform simple operation required for printing.

As many apparently widely different embodiments of the invention may be made without departing the spirit and scope thereof, it is to be understood that the invention is not limited to the specific embodiment described so far. For example, in the description of the embodiment, digital still cameras are taken as an example as the image data acquisition means, but the image data acquisition means is not limited to the digital still cameras and may be machines for handling an image as digitized data, such as image scanners, film scanners, and digital video cameras. The print apparatus of the invention can also be compatible with the machines manufactured by different manufactures, in which case the processing tendency and characteristics of each of the models of the machines are previously examined and the image data processing contents corresponding thereto are preset.

In the description of the embodiment, the image data stored on the memory card is taken as an example as the image data to be processed, but the scope of the invention is not limited to it; the image data may be image data recorded on any other record medium, such as a floppy disk or compact disk (CD). Further, the image data may be provided through communication means, such as a universal serial bus (USB), a small computer system interface (SCSI), IEEE 1394, infrared communication, or an LAN, as described above from various image data acquisition means rather than the image data recorded on a record medium.

Further, in addition to the image correction contents shown as an example in the embodiment, various types of processing, such as noise removal processing and smoothing processing, are possible as the image correction contents.

The image data processing method of the invention can be applied not only to the photo printer used in the embodiment, but also as an image data processing method for printing on a conventional printer connected to an information processing machine such as a PC for use.

In the embodiment, the print apparatus has been described as an output unit, but it is possible to provide the optimum output result for any other output unit than the print apparatus, such as output to a video projector, output to a CRT, or output to a television.

The described image data processing program of the invention for performing image data processing so as to provide the optimum output result can be recorded on record media such as a floppy disk, an optical disk, and a hard disk, and the invention also includes the record media recording the image data processing program. The processing program may be obtained from a network.

As described throughout the specification, in the invention, the image data processing contents considering the characteristics peculiar to the image data acquisition means are preset corresponding to the identification information assigned for identifying the image data acquisition means, and which image data acquisition means the image data provided by one image data acquisition means is acquired by is determined according to the identification information, then the image data is processed in accordance with the image data processing contents responsive to the determination result. Thus, the image data processing considering the characteristics peculiar to the model is performed automatically and the image data processed accordingly is used to output an image, whereby a high-quality output result can be produced regardless of the model difference.

The model names assigned to the image data acquisition means are used as the identification information assigned for identifying the image data acquisition means. It is a general rule that the model names are all products, and use of the already existing identification information eliminates the need for preparing new identification information to embody the invention. It is also a general rule that the information representing the model name exists together with the read image data, thus the model name can be specified easily.

It is made possible to execute the optimum image correction processing contents and the optimum resizing processing contents considering the characteristics peculiar to the model. The image correction processing contents are, for example, color correction processing, brightness correction processing, contrast correction processing, color saturation correction processing, noise removal processing, smoothing processing, and contour correction processing. The corrections are made whenever necessary in response to the model, whereby appropriate image correction processing can be performed. The image scaling processing contents are those set based on the resolution of the image data acquisition means, thus the optimum image scaling processing can be performed in response to the model. Such image correction processing and image scaling processing are automatically performed considering the characteristics peculiar to the model and the image data processed accordingly is used to output an image, whereby a high-quality output result can be produced regardless of the model difference.

Thus, according to the invention, the image data processing considering the characteristics peculiar to the model is performed automatically before output processing is performed, so that a high-quality output result can be produced regardless of the model difference. Moreover, the processing is all performed automatically on the print apparatus, so that the user need not be conscious of the characteristics of the image data acquisition means such as digital still cameras at all and needs only to perform simple operation required for outputting; whereby a high-quality output result can be produced

What is claimed is:

1. An image data processing method for making it possible to read image data acquired by different types of image data acquisition means and processing the read image data so as to provide an optimum output result, said image data processing method comprising the steps of:
   presetting image data processing contents considering processing operation characteristics of the image data acquisition means assigned the identification information in response to identification information assigned for identifying the different types of image data acquisition means;
   reading the image data provided by one image data acquisition means as image data to be processed;
   determining which image data acquisition means the image data to be processed is acquired by according to the identification information;
   selecting the image data processing contents corresponding to the determination result in response thereto; and
   processing the image data to be processed so as to provide the optimum output result in accordance with the selected image data processing contents;
   wherein the image data processing contents are image correction processing contents for making a correction to an image and image scaling processing contents for enlarging and reducing an image,
   wherein the image correction processing contents include color correction processing, brightness correction processing, contrast correction processing, color saturation correction processing, noise removal processing, smoothing processing, and contour correction processing, at least one correction processing of which is performed, and
   wherein the image scaling processing contents are to perform image scaling processing set based on a resolution of the image data acquisition means.

2. The image data processing method as claimed in claim 1 wherein the identification information assigned for identifying the different types of image data acquisition means is model names assigned to the image data acquisition means.

3. The image data processing method as claimed in claim 1, wherein the image data to be processed is image data on a record medium recording the image data acquired by the image data acquisition means, and
   wherein the identification information is information with the image data recorded on the record medium.

4. The image data processing method as claimed in claim 1, wherein the image data to be processed is image data transferred through communication means from the image data acquisition means, and wherein the identification information is information with the image data transferred through the communication means.

5. An image data print apparatus for making it possible to read image data acquired by different types of image data acquisition means, processing the read image data so as to provide an optimum output result, and printing the processed image data, said image data print apparatus comprising:
- an image data read section capable of reading image data acquired by different types of image data acquisition means as image data to be processed;
- a model determination section for determining which image data acquisition means the image data acquisition means is from identification information assigned for identifying the different types of image data acquisition means;
- an image data processing content storage section for storing image data processing contents considering the processing operation characteristics of the image data acquisition means assigned the identification information in response to the identification information assigned for identifying the different types of image data acquisition means;
- an image data processing section for receiving the determination result from said model determination section, selecting the image data processing contents corresponding to the determination result out of said image data processing content storage section, and executing the image data processing contents; and
- a print processing section for performing print processing of the image data processed by said image data processing section;
- wherein the image data processing contents executed by said image data processing section are image correction processing contents for making a correction to an image and image scaling processing contents for enlarging and reducing an image,
- wherein the image correction processing contents include color correction processing, brightness correction processing, contrast correction processing, color saturation correction processing, noise removal processing, smoothing processing, and contour correction processing, at least one correction processing of which is performed, and
- wherein the image scaling processing contents are to perform image scaling processing set based on a resolution of the image data acquisition means.

6. The image data print apparatus as claimed in claim 5, wherein the identification information assigned for identifying the, different types of image data acquisition means is model names assigned to the image data acquisition means.

7. The image data print apparatus as claimed in claim 5, wherein the image data to be processed, read by said image data read section is image data on a record medium recording the image data acquired by the image data acquisition means, and
wherein the identification information is information with the image data on the record medium.

8. The image data print apparatus as claimed in claim 5, wherein the image data to be processed, read by said image data read section is image data transferred through communication means from the image data acquisition means, and
wherein the identification information is information with the image data transferred through the communication means.

9. A record medium recording an image data processing program for making it possible to read image data acquired by different types of image data acquisition means, processing the read image data so as to provide an optimum output result, and printing the processed image data, said image data processing program comprising the steps of:
- reading image data acquired by one image data acquisition means as image data to be processed;
- determining which image data acquisition means the image data acquisition means is from identification information assigned for identifying the different types of image data acquisition means; and
- receiving the determination result as to which image data acquisition means the image data acquisition means is, selecting the image data processing contents considering the processing operation characteristics of the image data acquisition means, and performing image data processing responsive to the image data processing contents;
- wherein the image data processing contents are image correction processing contents for making a correction to an image and image scaling processing contents for enlarging or reducing an image, and
- wherein the image correction processing contents include color correction processing, brightness correction processing contrast correction processing, color saturation correction processing, noise removal processing, smoothing processing, and contour correction processing, at least one correction processing of which is performed, and
- wherein the image scaling processing contents are to perform image scaling processing set based on a resolution of the image data acquisition means.

10. The record medium recording the image data processing program as claimed in claim 9, wherein the identification information assigned for identifying the different types of image data acquisition means is model names assigned to the image data acquisition means.

11. The record medium recording the image data processing program as claimed in claim 9, wherein the image data to be processed is image data on a record medium recording the image data acquired by the image data acquisition means, and
wherein the identification information is information with the image data recorded on the record medium.

12. The record medium recording the image data processing program as claimed in claim 9, wherein the image data to be processed is image data transferred through communication means from the image data acquisition means, and
wherein the identification information is information with the image data transferred through the communication means.

* * * * *